W. U. HOOVER.
Band Cutter and Feeder for Thrashing Machines.
No. 46,905.  Patented March 21, 1865.
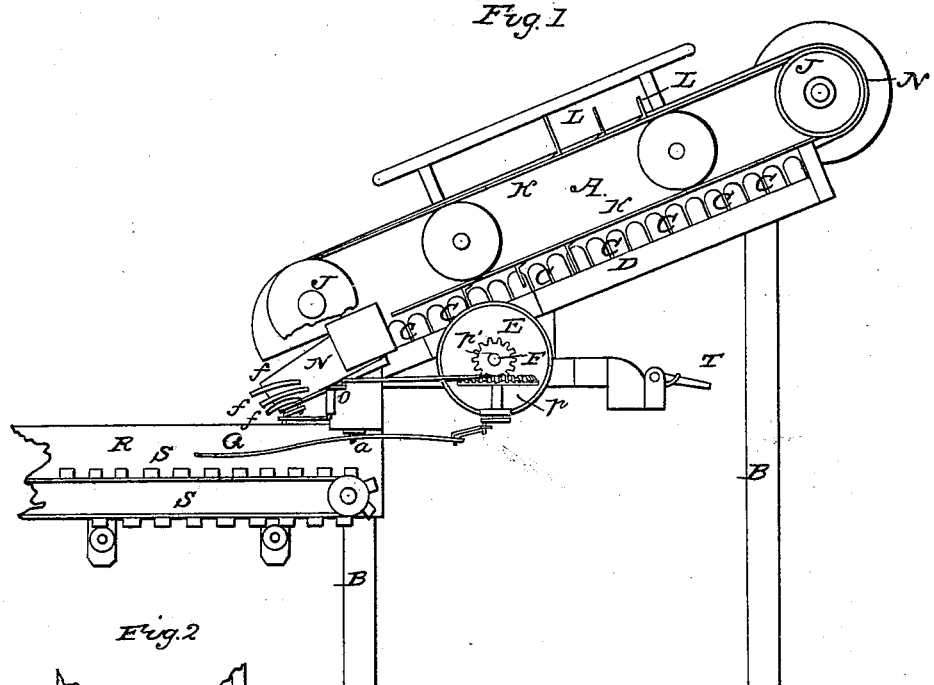
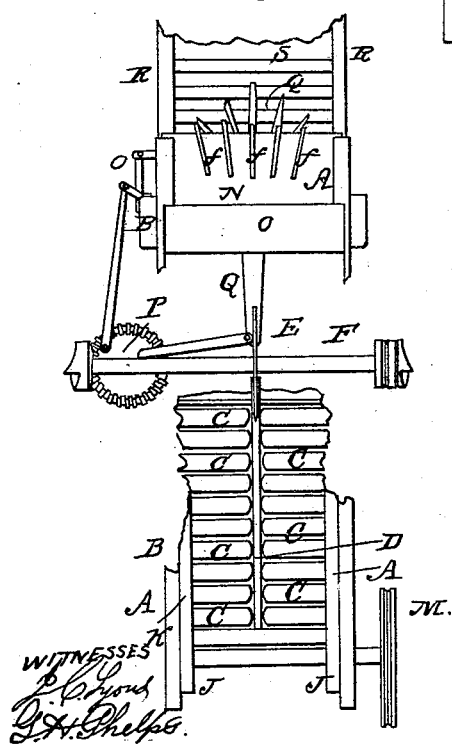
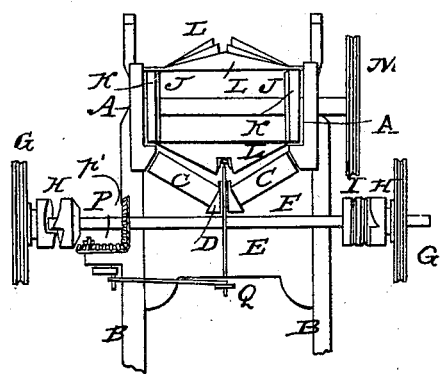

UNITED STATES PATENT OFFICE.

W. UPTON HOOVER, OF MACOMB, ILLINOIS.

BAND-CUTTER AND FEEDER FOR THRASHING-MACHINES.

Specification forming part of Letters Patent No. 46,905, dated March 21, 1865.

*To all whom it may concern:*

Be it known that I, W. UPTON HOOVER, of the town of Macomb, in the county of Macdonough and State of Illinois, have invented a new and Improved Machine for Cutting the Bands of Sheaves of Grain when being Fed into a Thrashing-Machine; and I do hereby declare the following to be a full, clear, and exact description of the same, reference being had to the accompanying drawings, in which—

Figure 1 is a vertical longitudinal section of my machine. Fig. 2 is a top plan view, portions being broken away so as to exhibit parts below; Fig. 3, an end view, portions being removed for the same purpose as in Fig. 2.

The nature of my invention consists in constructing a machine that shall not only sever the bands of the sheaves as they pass through it to the thrasher, but shall also separate and distribute the straw in such a manner that it shall pass uniformly and evenly to the thrashing-cylinder.

That others skilled in the art may understand the construction and operation of my device, I will particularly describe it.

A is the frame inclosing and supporting the mechanism. B B are legs supporting the frame A. The frame A is provided with a bottom composed of the rollers $c\ c\ c$, of which there are two sets, as shown in Figs. 2 and 3, which are inclined to each other, as shown in Fig. 3. The inner or lower ends of these rollers are supported by the string-piece D, through which, near its forward end, is a slot long enough and wide enough to contain the edge of the revolving knife E. The knife E, I prefer to make circular, as represented, though other forms might be adopted, if desirable. It is mounted on the shaft F, which is driven by a belt from the cylinder of the thrasher over a pulley, G, provided with a clutch, H, and from it, by means of other pulleys, I, other parts of the mechanism receive motion. It is provided with a pulley at each end, so that the belt may be shifted from side to side, as may be most desirable. The shaft F is provided with a clutch at each end for the same reason. This, however, is merely a matter of convenience, and has no special weight. At each end of the frame A are the pulleys J, over which pass the endless belts K. At intervals I attach to the belts K the rakes L L L, which pass across the machine, as shown in Fig. 3.

Each succeeding rake in each set is higher than the preceding one, and they are cut away as shown, when necessary, to allow them to straddle the knife E. (See Fig. 3.) The belts K and rakes L receive motion through the shaft F and pulley M, and the rakes are thereby caused to traverse the whole length of the frame, sweeping close over the rollers $c$.

At the front end of A is a vibrating table, N, which is pivoted at $n$ and is caused to vibrate by means of the rock-shaft O and its connecting-rods, motion being taken from the shaft F through the beveled gears P and P'. The table N is provided with slats or fingers $f f$ on its upper surface.

Beneath the table N, and projecting beyond it, is a set of vibrating fingers, Q, having a lever projecting backward under the machine. The fork or fingers Q are pivoted to the frame A at its front end, as shown at $a$, Fig. 1, and is caused to vibrate by a crank or equivalent device attached to the pinion P.

Beneath the front end of the frame A, and connecting it to the thrashing-machine, is another frame, R, bearing the endless slotted apron S, which likewise receives motion from the shaft F by means of a belt and pulley. (Not shown in the drawings.) This apron conveys the grain direct to the thrashing-cylinder.

The operation of my machine is as follows: The thrasher being set in motion, the clutch H is thrown into gear by its rod, the handle of which is seen at T, Fig. 1, and the knife E belts K, rakes L, and all the other working parts are set in motion. The sheaves of grain are thrown into the frame A in the usual manner, and as they pass over the rapidly-revolving knife E the band is severed with certainty and dispatch. Then comes the first or shortest of the rakes L and carries the upper portion of the sheaf forward upon the vibrating table N, which scatters it upon the fingers Q, by which it is more uniformly distributed upon the apron S. The second and third of the series of rakes quickly follow the first, each taking a deeper hold than its predecessor, until the last takes all that may be left, and another sheaf succeeds, and so on. The grain is distributed very evenly upon the slotted apron, which conveys it directly in that condition to the thrashing-cylinder.

If found to be necessary, the pulleys J may be provided with spurs and the belts K be perforated, so that it will be impossible for them to slip. The endless belt or slatted apron S may, if desired, be similarly provided. Any convenient tightening device may also be applied, and the amount of vibration given to N or Q may be controlled in the ordinary way by making the connections nearer the centers of motion. The knife E may be constructed with a sickle-edge, and that is probably the best form for it.

Having described my invention, what I claim to be new, and desire to secure by Letters Patent, is—

1. In combination with the rollers $c\ c$ and frame A, the revolving smooth or sickle-edged knife E, substantially as described and for the purpose set forth.

2. The rakes L L, constructed and operated substantially as described.

3. The vibrating table N, substantially as described, and for the purpose set forth.

4. In combination with the vibrating table N, the vibrating fork or fingers Q, substantially as described, and for the purpose set forth.

5. The combination of the revolving knife E, rakes L, vibrating table N, vibrating fork or fingers Q, constructed and operated, substantially as described.

W. UPTON HOOVER.

Attest:
C. F. WHEAT,
G. W. SMITH.